United States Patent

[11] 3,593,622

[72] Inventor Karl H. Sengewald
 4801 Kunsebeck, Westphalia, Germany
[21] Appl. No. 871,018
[22] Filed June 23, 1969
[23] Division of Ser. No. 685,668, Nov. 24, 1967, Pat. No. 3,468,470
[45] Patented July 20, 1971
[32] Priority Nov. 23, 1966, Sept. 30, 1967
[33] Germany
[31] S107086 and S112234

[54] METHOD OF MANUFACTURING PLASTIC CARRIER BAGS
 4 Claims, 7 Drawing Figs.
[52] U.S. Cl. .................................................. 93/35 PT
[51] Int. Cl. .................................................. B31b 49/04
[50] Field of Search .......................................... 93/35 R, 35 PT; 229/55

[56] References Cited
UNITED STATES PATENTS
2,401,109  5/1946  Rohdin ........................ 93/35 PT
2,773,636  12/1956  Williams et al. ............. 229/55

Primary Examiner—Bernard Stickney
Attorney—Holman and Stern

ABSTRACT: A method of forming a carrier bag made of synthetic thermoplastic material wherein a printed flat sheet of plastic has two reinforcing strips attached thereto and uniformly spaced relative to the median longitudinal axis of the sheet. The sheet is then bent about the longitudinal median axis to form a hose longitudinally open at one side so that the reinforcing strips are opposite one another. Lateral folds are formed in the hose to form two collapsible sidewalls and two reinforced sidewalls, and a longitudinal weld seam is made to longitudinally close the hose. Furthermore, a bottom weld seam transverse to the longitudinal weld seam is made and the so formed bag is separated from the strip and a grip aperture is formed in the upper portion of the bag. It is also possible to have the upper portion contoured simultaneously with the forming of the grip aperture.

PATENTED JUL 20 1971 3,593,622
SHEET 1 OF 2
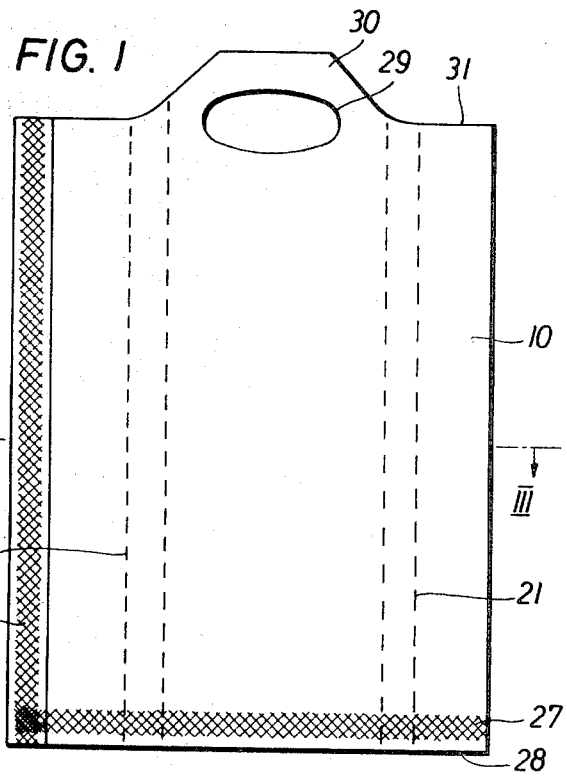
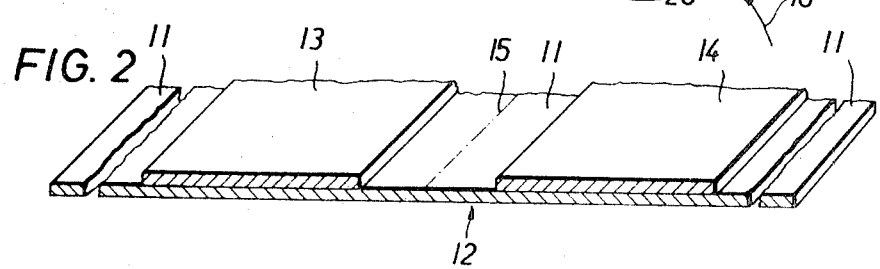
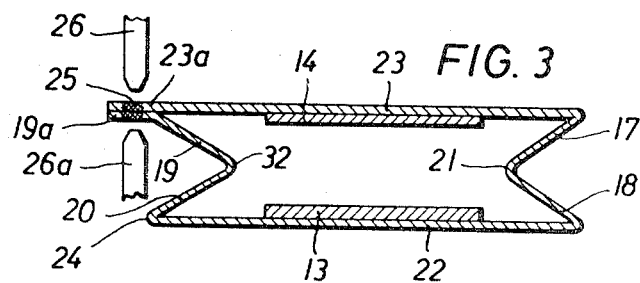
INVENTOR.
KARL HEINZ SENGEWALD
BY Holman, Glascock,
Downing & Seebold
ATTORNEYS

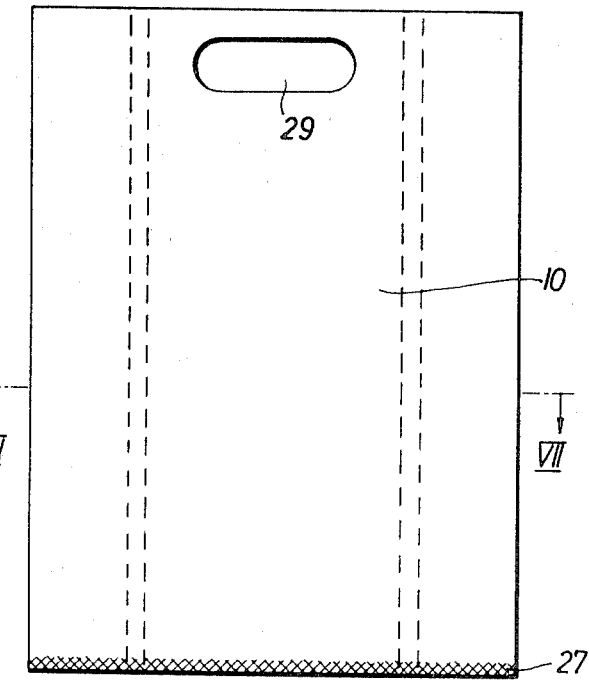
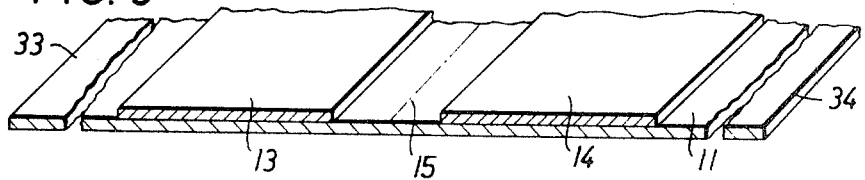
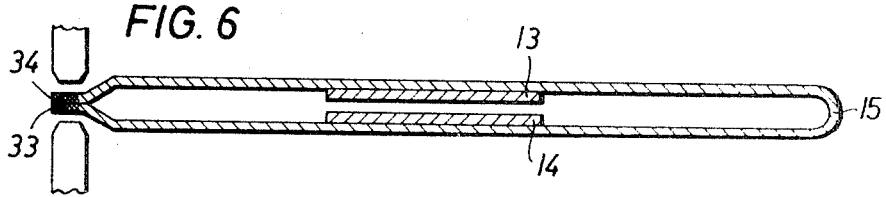
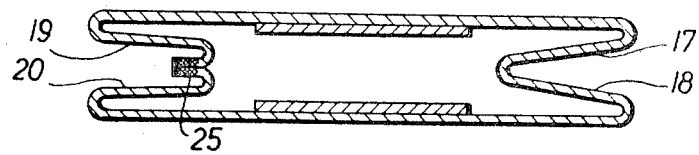

METHOD OF MANUFACTURING PLASTIC CARRIER BAGS

This is a division of application Ser. No. 685,668, filed Nov. 24, 2967, Now Pat. No. 3,468,470, issued Sept. 23, 1969, entitled "Carrier Bag."

The invention relates to a method of manufacturing a carrier bad made of a foil of synthetic thermoplastic material, provided with lateral folds on both sides.

The object of the invention is to produce a carrier bag, whole entire external surface can be printed with relatively simple means, and which has a reinforcement extending over the whole of its height and also over a substantial portion of its width. To achieve this end, hitherto considered impossible, it is proposed to make the carrier bag of a printed band of synthetic thermoplastic foil, which is provided with two reinforcing strips symmetrically spaced relative to the median longitudinal axis thereof, which, in the finished bag, extend over the whole of the height and are arranged in the width in the region comprised between the lateral folds provided on both sides of the carrier bag, these folds being produced after folding of the flat band about the median longitudinal axis and the longitudinally extending weld seam closing the hose thus formed. The carrier bag is further provided with a bottom weld seam and has on its upper open end apertures punched into the strip-reinforced wall portions.

The longitudinal weld seam joins the two lateral folds along their line of folding. This feature facilitates the provision of the weld seam, since the latter is then obtained by welding together the edges of the half-hose resulting from the folding of the flat foil band about its median longitudinal axis, which edges are pressed inwards following the completion of the longitudinally extending weld seam. Hitherto, it was not considered possible to produce lateral folds following a welding along the line of joint between the lateral folds. However, this can be achieved with the aid of a combination consisting of a carriage arranged in the interior of the hose and a blade or roller cooperating therewith from outside the hose, which pushed inwards the edge of the hose to form the lateral folds.

The external walls of the carrier bag are flat, and the glued-on reinforcing strips are provided on the inner faces turned towards each other.

The lateral folds on one edge of the hose may have different depths, and the lateral fold of greater depth is joined on its outward projecting edge with the edge of the associated hose wall by means of a longitudinal weld seam.

The longitudinally extending weld seam is located within the fold on one side of the carrier bag. It is achieved hereby, that owing to it location said longitudinally extending weld seam is practically invisible.

The thickness of the reinforced wall of one side of the carrier bag corresponds to the unreinforced wall portion in the region of the lateral folds of the carrier bag edges augmented by the thickness of a lateral fold. However, the thickness of the reinforced wall on one side of the carrier bag may also be greater than the thickness of the nonreinforced wall portion in the region of the lateral folds on the edges of the carrier bag, augmented by the thickness of a lateral fold. The gripping edge may protrude over the upper edge of the carrier bag, and the horizontally extending axis of symmetry of the oval grip aperture may be arranged at the level of the upper edge of the carrier bag.

For producing the aforedescribed carrier bag, it is proposed according to the invention to affix to a foil, preferably by pasting, two reinforcing strips uniformly spaced relative to the median longitudinal axis of said foil, thereafter bending the foil by 180° about its median longitudinal axis to form a hose open at one edge and producing on the two longitudinal edges of said hose lateral folds in such a manner, that the lateral folds of one edge differ from each other in depth, joining thereafter the fold of greater depth on its outward projecting edge to the edge of the adjoining hose wall by a longitudinal edges by welding and then producing the lateral folds, followed by a transverse closure weld with a separating cut form the bottom of the carrier bag. It is further proposed to form the grip aperture and the contours of the upper edge of the carrier bag by stamping simultaneously with or after the transverse closure weld.

The invention will now be described with reference to the accompanying drawings, which illustrate the invention but in no restrictive sense, in which:

FIG. 1 shows a carrier bag made according to the invention, in side elevation;

FIG. 2 shows a flat foil with affixed reinforcing strips for producing the carrier bag of FIG. 1, in sectional and perspective view;

FIG. 3 is a section through the carrier bag, taken along the line III–III of FIG. 1;

FIG. 4 illustrates another carrier bag made according to the invention, in side elevation;

FIG. 5 shows in perspective view the flat foil with affixed reinforcing strips for producing the carrier bag of FIG. 4;

FIG. 6 illustrates sectionally the closure of the foil band bent into a half-hose for producing the carrier bag of FIG. 4; and FIG. 7 is a section through the carrier bag of FIG. 4, taken along the line VII–VII.

The carrier bag 10 consists of a foil made of a synthetic thermoplastic material. It is produced from a flat foil 11 illustrated in FIG. 2, whose downward-turned surface, referenced 12 in FIG. 2, is printed. This flat foil 11 is very easy to print, in particular over its entire surface. After printing, two identical reinforcing strips 13 and 14 are affixed to the unprinted upper face of the flat foil 11, symmetrically relative to the median longitudinal axis 15 of the foil. The affixing of the strips is carried out continuously with the aid of a pasting adhesive, which makes it possible to affix about 100 meters of reinforcing strips 13, 14 per minute. The application of a pasting adhesive offers the advantage that in spite of the indicated high rate of production no twisting of the foil 11 occurs, and the latter remains completely smooth on the outside. The reinforcing strips 13 and 14 could also be joined to the foil by thermal effects, or layers of said foil could also be welded together. However, the use of a pasting adhesive, especially of a two-component adhesive, is more advantageous.

After the reinforcing strips 13, 14 have been affixed to the foil in the aforedescribed manner and location, the foil 11 is bent by 180° about the median longitudinal axis 15 in the direction indicated by the arrow. This brings the reinforcing strips 13 and 14 in positions precisely opposite each other, as can also be seen in FIG. 3 showing the finished carrier bag.

Following this formation of a hose from the foil 11, which is open at the left-hand edge shown in the drawing, the lateral folds 17 and 18 are produced in the right-hand edge of the hose, and corresponding folds 19, 20 are produced on the left-hand edge of the hose. The folding line 21 between lateral folds 17 and 18 then corresponds to the median longitudinal axis 15 of the original foil 11.

FIG. 3 shows, that the front bag wall 22 in the side elevation of FIG. 1 has a smaller width than the rear bag wall 23. Moreover, the depth of lateral fold 20 is shallower than that of lateral fold 19. On the left-hand side therefore the lateral fold 19 overhangs the left frontal edge 24 of the carrier bag, which is also overhung by the rear wall 23. This arrangement is provided in order to make possible the continuous joining of the externally located edge 19a of lateral fold 19 and the edge 23a of the rear wall 23 by means of a longitudinal weld seam 25, without being hindered by either the hose edge 24 or the lateral folds 19 and 20. The required welding bars, which may also be heated rollers, are referenced with 26 and 26a.

After completion of the longitudinal weld seam, the transverse weld 27 with the separating cut 28 is effected by sections to form the bottom of the carrier bag and to separate a carrier bag from the hose. The contour of the grip aperture 29 and the contour of the carrier grip 30 can also be simultaneously produced by stamping while effecting this transverse weld. It is obvious that instead of the oval grip aperture 29 here shown the grip aperture may also have a nonannular form.

In addition to the embodiment shown in FIG. 1 with a carrier grip 30 projecting above the upper edge 31 of the carrier bag, said upper edge may also be formed so as to be completely horizontal, in consequence of which the grip aperture 29 will be located below the edge 31.

The reinforcements 13 and 14 within the carrier bag, located on portions of walls 22 and 23 facing each other, extend not only over the entire height of the carrier bag, but also over a substantial part of the width thereof. Their width is such, that they extend in close proximity of folding line 21 of the lateral folds 17 and 18 and of the folding line 32 of lateral folds 19 and 20. Moreover, the thickness of the reinforcements 13 and 14 preferably corresponds to the thickness of foil 11. It will be ensured hereby, that when the carrier bag is laid flat with the reinforcements 13 and 14 touching each other, the overall thickness of the carrier bag will be the same over the entire width of the bag. In order to obtain a carrier bag of high dimensional stability and mechanical strength in spite of suing relatively thin foil material, the reinforcements 13 and 14 may consist of a relatively stronger or more rigid foil material. However, it is also possible to select the thickness of the reinforcements 13, 14 greater than that of the foil, in particular by taking into account the feature whereby the reinforcements 13, 14 are of a relatively great width, and thus when the carrier bag is laid flat they bear against each other with a correspondingly large surface, so that carrier bags stacked one upon another do not slop off the stack.

There is thus provided according to the invention a carrier bag which, for a relatively small expenditure in material has a high carrier strength and which at the same time can be printed and is preferably printed on all its external surfaces, inclusive of the external surfaces of lateral folds 17, 18, 19 and 20.

According to FIG. 4, the carrier bag 10 is likewise produced from a printed flat band 11, on which reinforcing strips 13 and 14 made of paper or plastic have been affixed symmetrically relative to the median longitudinal axis of the flat band 11 and joined thereto by means of a pasting adhesive. Following this, the flat band is bent about the median longitudinal axis 15 to form a half-hose, as can be seen in FIG. 6. The two reinforcing strips 13 and 14 are then located opposite to each other. The two oppositely located edges 33 and 34 of the half-hose of FIG. 6 are then continuously welded together, preferably by ultrasonics. Lateral folds are then produced in the resulting hose, folds 17, 18 on one side and folds 19, 20 on the other.

The lateral folds 19 and 20 are joined by the weld seam 25 shown in FIG. 7. In the finished carrier bag, this weld seam will therefore be located within the fold, practically invisible from the outside. The hose is then provided with a bottom weld seam 27.

In the region of the upper filling end of the carrier bag, a grip aperture 29 in each case is punched into the reinforcing strips 13 and 14 and in the associated walls of the carrier bag.

For the sake of simplicity in the drawings, FIG. 5 shows the reinforcing strips 13 and 14 as being at a small distance from the median longitudinal axis. The real proportions are apparent from FIGS. 6 and 7, according to which the reinforcing strips extend over a distance in width which approximately corresponds to the distance between the lateral folds located opposite to each other on the two sides of the carrier bag, and as a rule is somewhat smaller than this distance.

Although the invention has been described and illustrated in detail, it is to be understood that this does not delimit the invention. The spirit and scope of this invention is limited only by the language of the appended claims.

The embodiments of the invention in which an exclusive property or privilege I claim are defined as follows:

1. A method of producing a carrier bag of synthetic thermoplastic foil comprising afixing a set of reinforcing strips to a printed flat band of foil so that they are uniformly spaced relative to the median longitudinal axis of said foil; bending the foil about the longitudinal median axis by about 180° to form a hose longitudinally open so that the strips are opposite one another; producing lateral folds in the hose to from two reinforced sidewalls and two collapsible sidewalls; forming a longitudinal weld seam to longitudinally close the hose; producing a bottom weld seam transverse the longitudinal one, separating the bag from the hose, and forming a grip aperture in the upper portion of the bag.

2. A method according to claim 1 wherein a separating cut, the grip aperture and a contour on the upper carrier bag edge are formed by stamping.

3. A method according to claim 1 wherein the lateral folds are made with different depths, the fold adjacent the longitudinal opening in the hose having the greater depth, the longitudinal edge of said fold then being joined to the longitudinal edge of the reinforced sidewall by said longitudinal weld seam.

4. A method according to claim 1 wherein the hose is longitudinally welded before the longitudinal folds are produced, and said longitudinal weld seam is contained wholly within one of said collapsible sidewalls.